United States Patent [19]

Wörner et al.

[11] Patent Number: 5,059,156
[45] Date of Patent: Oct. 22, 1991

[54] DIVIDED FLYWHEEL

[75] Inventors: Günter Wörner, Kernen; Ernst Tscheplak, Weinstadt, both of Fed. Rep. of Germany

[73] Assignee: Daimler-Benz AG, Stuttgart, Fed. Rep. of Germany

[21] Appl. No.: 584,492

[22] Filed: Sep. 14, 1990

Related U.S. Application Data

[63] Continuation of Ser. No. 296,143, Jan. 12, 1989, abandoned.

[30] Foreign Application Priority Data

Jan. 26, 1988 [DE] Fed. Rep. of Germany ....... 3802106

[51] Int. Cl.$^5$ ............................................. F16D 13/70
[52] U.S. Cl. .................................... 464/68; 192/106.2
[58] Field of Search ...................... 74/574; 192/106.2; 464/64, 66, 67, 68

[56] References Cited

U.S. PATENT DOCUMENTS

| | | | |
|---|---|---|---|
| 3,138,011 | 6/1964 | Stromberg | 464/68 X |
| 3,266,271 | 8/1966 | Stromberg | 464/64 |
| 4,485,909 | 12/1984 | Gatewood | 464/68 X |
| 4,611,701 | 9/1986 | Friedmann | 192/110 B |

FOREIGN PATENT DOCUMENTS

| | | | |
|---|---|---|---|
| 0259173 | 3/1988 | European Pat. Off. | |
| 3505069 | 2/1986 | Fed. Rep. of Germany | 192/106.2 |
| 3629225 | 3/1987 | Fed. Rep. of Germany | 464/68 |
| 2577642 | 8/1986 | France | |
| 201933 | 9/1986 | Japan | 192/106.2 |
| 2163524 | 2/1986 | United Kingdom | 464/68 |

OTHER PUBLICATIONS

"The Two-Mass Flywheel-A Torsional Vibration Damper for the Power Train of Passenger Cars-State of the Art and Further Technical Development", SAE Technical Paper Series #870394, Arno Sebulke, pp. 1-10, Feb. 87.

Primary Examiner—Thomas R. Hannon
Attorney, Agent, or Firm—Evenson, Wands, Edwards, Lenahan & McKeown

[57] ABSTRACT

The flywheel elements are resiliently coupled by means of two groups of springs which are connected in parallel. One group of springs operates with play and becomes operative substantially only when high torques are transmitted. At low speeds when only low torques can be generated by the engine, the flywheel has a very low resonance frequency determined solely by the second group of springs without play. This frequency remains below the frequencies of the vibrations which occur in this service phase. Upon the transmission of higher torques generated by the engine at higher speeds, although the resonance frequency rises due to the effect of the first group of springs with play, nevertheless, the resonance frequency remains below the frequency of the vibrations which occur at higher speed.

5 Claims, 3 Drawing Sheets

DIVIDED FLYWHEEL

This is a continuation, of application Ser. No. 07/296,143, filed Jan. 12, 1989, now abandoned.

BACKGROUND AND SUMMARY OF THE INVENTION

The invention relates to a divided flywheel having two flywheel elements arranged coaxially with each other. The flywheel masses are substantially distributed equally between the two elements and there is a spring arrangement connected therebetween. The spring arrangement has at least two groups of springs connected in parallel, one of which has play. A frictional coupling is also operative between the two flywheel elements.

In a divided flywheel of this type which is known from DE-OS 3,629,225, at least one part of the frictional coupling arranged between the flywheel elements is continuously operative. Another coupling part has play, that is to say it is inoperative within a certain angle of rotation. When this angle of rotation is used up by relative movement between the flywheel elements, the other coupling part also becomes operative. Then as soon as the direction of the relative movement of the flywheel elements is reversed, the total play of the other coupling has to be used up before it can also become operative in that direction of the relative movement.

This known divided flywheel still does not exhibit ideal behavior.

A divided flywheel should in principle operate in the so-called supercritical range, that is to say the frequency of the vibrations excited by the engine during road service should lie above the resonance frequency of the divided flywheel and simultaneously, a negligible frictional engagement should exist between the flywheel elements. If both conditions are ensured, then the transmission line and the engine are virtually completely decoupled vibrationally from each other. At low engine speeds, and particularly near the no-load speed of the engine, the operation of the divided flywheel in the supercritical range cannot immediately be ensured, because at these speeds the resonance frequency of the flywheel and the frequencies of the vibrations excited by the engine lie close together. They even coincide under some conditions. In this service phase, a high frictional engagement between the flywheel elements is desirable in order to prevent excessive vibration amplitudes occurring due to resonance effects.

With the flywheel known from DE-OS 3,629,225 it is impossible to ensure maximum comfort either at high speeds or at low speeds, because at high speeds, i.e., during normal road service of a motor vehicle, it is impossible to achieve the desirable complete vibrational decoupling of the engine and transmission line due to the one coupling which always remains operative.

It is therefore the object of this invention to produce a divided flywheel which permits optimum vibrational isolation between engine and transmission line under all service conditions, without permitting relative movements of the flywheel elements with excessive amplitudes during load changes or when passing through the resonance range.

This object is achieved in a flywheel of the type initially defined in that the frictional coupling has play (its friction elements or friction lamellae being connected with play in the circumferential direction to at least one flywheel element) and that the spring constants of the groups of springs are dimensioned so that the frequencies of the vibrations which can be generated at the starting speed and no-load speed of the engine lie above a low first critical frequency, determined by the group of springs without play, and the frequencies of the vibrations which can be generated at service speeds lie above a higher second critical frequency of the flywheel, determined by both groups of springs conjointly.

The invention utilizes the fact that an internal combustion engine exhibits an extremely low torque at low speeds and the spring arrangement between the flywheel elements therefore has to transmit only low torques if any. These low torques can be absorbed solely by the group of springs without play, without stressing the group of springs with play. The resonance frequency of the flywheel when transmitting extremely low torques is therefore determined substantially only by the group of springs without play, with the result that the resonance frequency has an extraordinarily low value. Therefore even vibrations excited at very low speeds, which have a very low frequency, may lie in the supercritical range of the flywheel. The flywheel according to the invention is therefore also suitable for modern engines which have a very low no-load speed.

As soon as higher torques have to be transmitted, the group of springs with play becomes operative in addition to the group of springs without play. Although this has the result that the resonance frequency of the flywheel is raised correspondingly, nevertheless, since the engine can generate higher torques only at higher speeds and the vibrations generated at higher speed have a higher frequency, the vibrations generated in the transmission line or by the engine remain in the supercritical range of the flywheel.

It is moreover advantageous that the two groups of springs can conjointly have greater rigidity, and accordingly the maximum relative rotation between the flywheel elements remains comparatively small. Undesirable resilience in the transmission line during load changes, and also undesirably high vibration amplitudes of the flywheel elements during the staring phase, are therefore prevented.

During normal service, i.e., so long as the flywheel operates in the supercritical range, the coupling with play virtually does not change the behavior of the flywheel, because the coupling is adjusted within a very short time under the influence of relative movements of the flywheel elements, so that the occurring vibrations have only small vibration amplitudes in the supercritical range and lie within the range of play.

On the other hand, the coupling with play operates in the sense of limitation of the vibration amplitudes, particularly during the starting phase, because when the play is used up, an additional resistance becomes operative between the flywheel elements in the sense of braking relative movements of the flywheel elements.

With a view to the smoothest possible operation of the flywheel, it is advantageous if the coupling play is somewhat greater than the play of the one group of springs.

It is also possible to have a further short-stroke rigid group of springs connected in parallel with a frictional coupling and arranged in series with the groups of springs which are connected in parallel. This further group of springs, conjointly with the friction coupling which is connected in parallel, damps excessive movements which the flywheel elements may occasionally execute under extremely unfavorable conditions or when the resonance frequency of the flywheel is excited for a long time during a plurality of attempts to start.

Other objects, advantages and novel features of the present invention will become apparent from the following detailed description of the invention when considered in conjunction with the accompanying drawings.

DETAILED DESCRIPTION OF THE DRAWINGS

Figure 1:
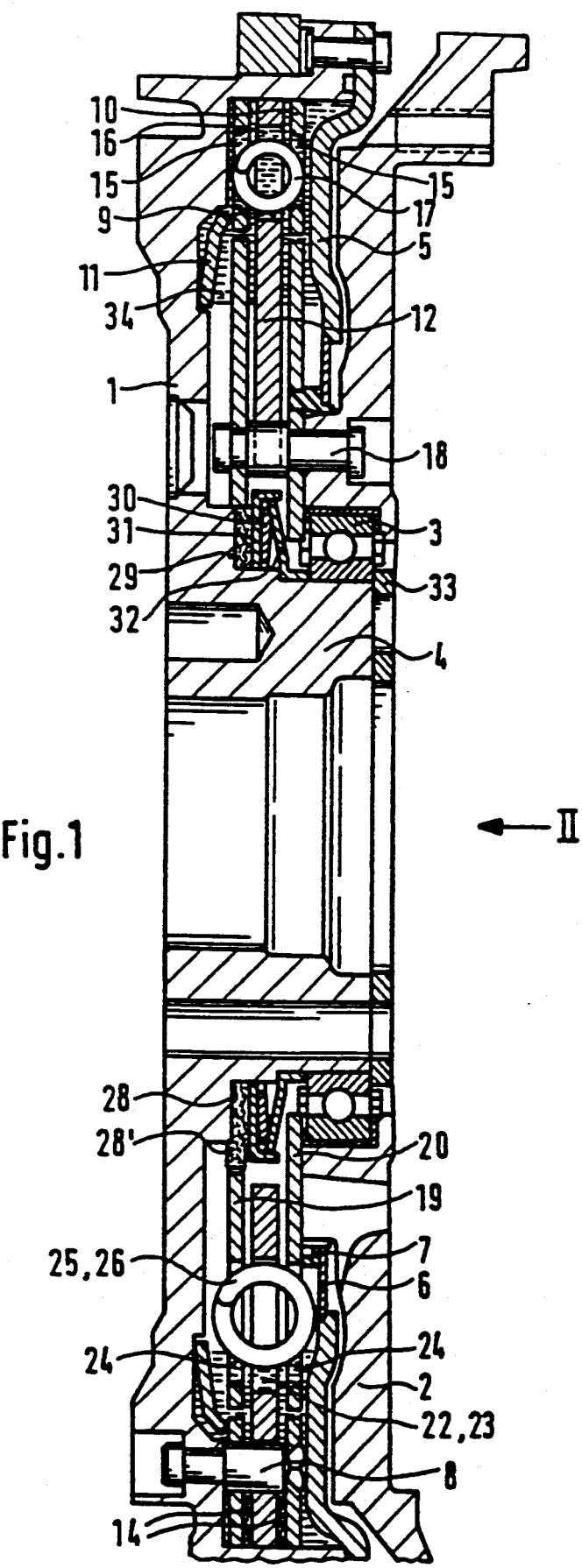
FIG. 1 shows an axial section of the flywheel according to the invention.
Figure 2:
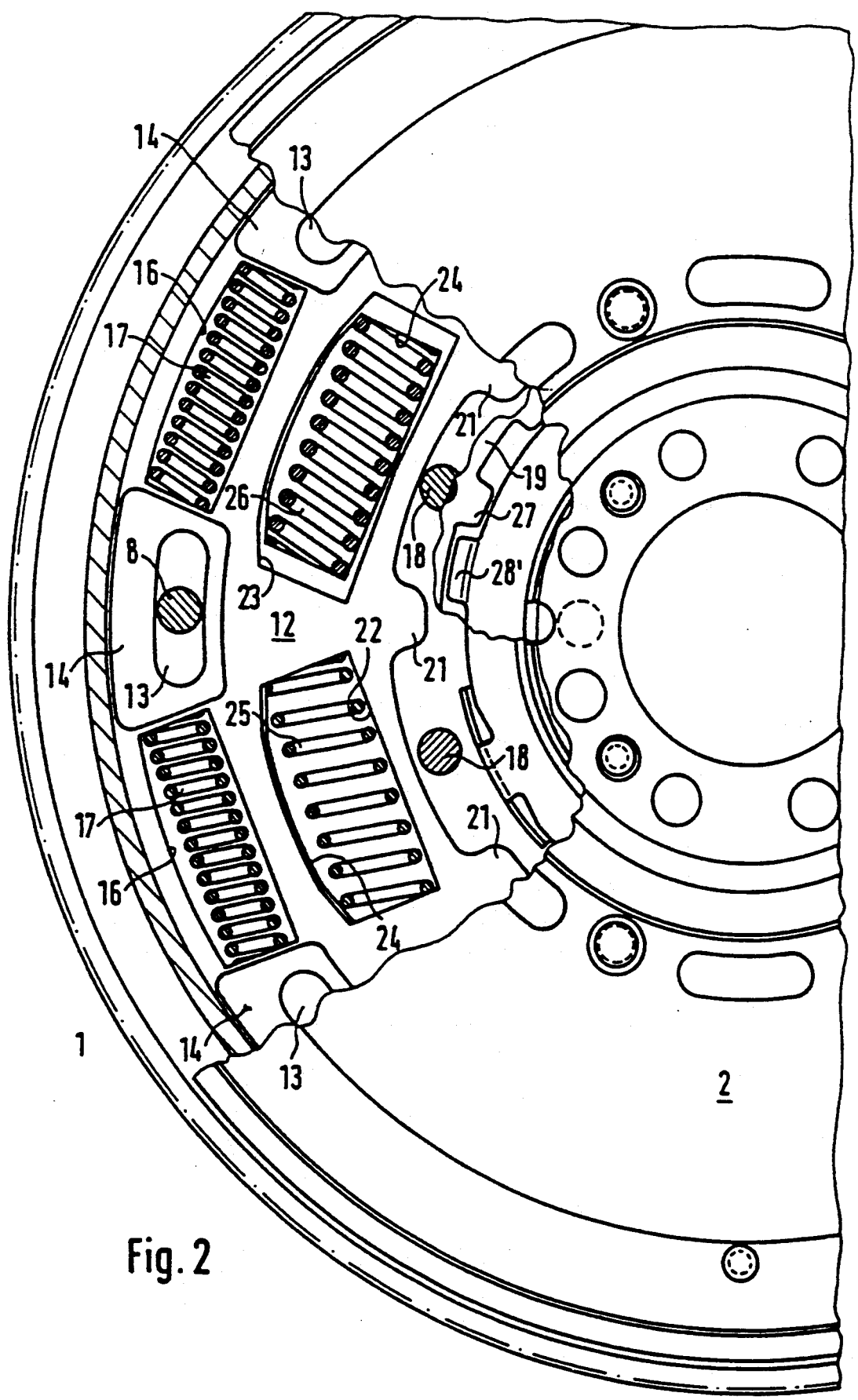
FIG. 2 shows a partly fragmented end elevation of the flywheel according to the arrow II in FIG. 1.

The divided flywheel shown in FIGS. 1 and 2 has an engine side flywheel element 1 and a flywheel element 2 mounted for rotation by a grooved ball bearing 3 on a hub part 4 of the flywheel element 1 and coupled by a coupling mechanism (not shown) to a vehicle transmission line. A ring plate part 5 is connected by radial outward extending flanges and screws arranged in a crown to a ring web on the outer circumference of the flywheel element 1 and faces the flywheel element 2. A ring space is open towards the hub part 4 between the plate 5 and the flywheel element 1. This ring space is closed relative to the flywheel element 2 by means of ring lamellae 6 and a sealing ring 7.

Two coaxial ring plates 9 and 10 are secured by bolts 8 to the flywheel element 1 within the said ring space. The ring plate 10 is fastened to the bolt 8 immovably in both axial and circumferential directions, whereas the ring plate 9 is secured on thickened regions of the bolt 8 with axial mobility and no mobility in the circumferential direction. The ring plate 9 is tensioned towards the ring plate 10 by a plate spring 11 which is clamped between the ring plate 9 and the flywheel element 1.

A further inner ring plate 12, which is arranged between the ring plates 9 and 10, has slots 13 (see FIG. 2) extending in the circumferential direction in the region of the bolts 8 and consequently has a limitedly rotation relative to the flywheel element 1, according to the length dimension of the slots 13.

Friction elements 14 are fixed to the further inner ring plate 12 on both its end faces in proximity of the slots 13 and cooperates with the ring plates 9 and 10. The ring plate 12 is clamped axially by these friction elements 14 under the tension of the plate spring 11, in the manner of a slip coupling. Ports 15 and 16 are arranged between the bolts 8 and slots 13 in the circumferential direction and are arranged in the ring plates 9, 10 and 12 tangentially to the plate axis. The ports 15 and 16 have equal length dimensions and receive therein, the relatively rigid, short-stroke, helicoidal springs 17 in a cage-like fashion. When the ring plate 12 rotates relative to the ring plates 9 and 10, or relative to the flywheel element 1, the helicoidal springs 17 each become resiliently compressed between a radial edge of one of the ports 16 of the ring plate 12 which stresses one helix end, and between the radial edges of the ports 15 of the ring plates 9 and 10 which stress the other spring end. Accordingly, the helicoidal springs 17 tend to urge the ring plate 12 into the central position shown in FIG. 2. Here the helicoidal springs 17 each abut the radial edges of the ports 15 and 16 with both ends and the ports 15 and 16 are mutually aligned in the axial elevation of the flywheel. In this central position the bolts 8 occupy a central position within the slots 13.

Bolts 18 ensure that the two ring plates 19 and 20 are fastened radially, fixed axially and rotate with the flywheel element 2 radially inside the ring plates 9 and 10 and adjacent to the hub 4. The axial interval of the ring plates 19 and 20 is dimensioned so that the ring plates 19 and 20 do not touch the ring plate 12.

The thickened regions of the bolts 18, between ring plates 19 and 20, cooperate with extensions 21, pointing radially inwards on the ring plate 12 (FIG. 2) to limit the rotation of the ring plate 12 relative to the flywheel element 2. The ring plate 12 can therefore rotate relative to the flywheel element 2 only by a limited amount which corresponds to the cut-out interval between the extension 21 in the circumferential direction.

Ports 22 and 23 are arranged in the ring plate 12 radially within the ports 16. Ports 24 in the ring plates 19 and 20 receive the springs 25 and 26 in a cage-like fashion. The ports 24 in the ring plates 19 and 20 have a length (in the circumferential direction) equal to the ports 22 of the ring plate 12. The ports 23 in the ring plate 12 are somewhat longer, so that in the central position of the ring plate 12 relative to the flywheel element 2 (FIG. 2), the radial edges of the ports 23 have a certain interval in the circumferential direction from the ends of the springs 26 therein. When the ring plate 12 initially rotates relative to the ring plates 19, 20 and flywheel element 2, at first the springs 25, which have relatively few turns, become compressed between a radial edge of a port 22 of the ring plate 12 and opposite radial edges of the ports 24 on the ring plates 19, 20. Upon a greater relative rotation between the ring plate 12 and the ring plates 19, 20, or flywheel element 2, the play of the springs 26, which exhibit a relatively large number of turns, in the ports 23 is also used up. Thus, the springs 26 likewise become resiliently compressed between a radial edge of the ports 23 of the ring plate 12 and opposite radial edges of the ports 24 of the ring Plates 19 and 20.

Extensions 27 (FIG. 2) are arranged on the inner circumferential edge of the ring plate 19 which is rotationally connected with the flywheel element 2 and between which end face extensions 28' of a friction ring 28 are received with play in the circumferential direction. This friction ring 28 cooperates with a radial ring surface 29 on the flywheel element 1. The friction ring is tensioned against the ring surface 29 by means of an annular plate spring 30, which is in turn is arranged between two plate rings 31 and 32 which are arranged non-rotatably but with axial mobility relative to each other. The plate ring 31 rests upon the facing end face of the friction ring 28, whereas the plate ring 32 is braced axially by a ring web on the radially inner bearing shell of the grooved ball bearing 3. The plate rings 31 and 32 have mutually facing extensions at their external circumferential edges which interlock each other and thereby maintain the plate rings 31 and 32 against rotation relative to each other.

When the ring plate 19 and its integral flywheel element 2 rotate relative to the flywheel element 1, the friction ring 28 rotates conjointly with the ring plate 19 and with the flywheel element 2 as soon as the play of the extensions 28' of the friction ring 28 between the extensions 27 of the ring plate 19 has been used up. A relative rotation then occurs between the friction ring 28, the ring surface 29 and the flywheel element 1, provided that the torques acting between the flywheel elements 1 and 2 are high enough to overcome the frictional resistance between the friction ring 28 and the ring surface 29.

The radially inner bearing shell of the grooved ball bearing 3 is secured axially between a flange ring 33 fastened to the flywheel element 1 and the ring web of the plate ring 32 already mentioned, which is braced axially against a ring step of the hub part 4. The radially outer bearing shell of the grooved ball bearing 3 is maintained axially between a ring web on the inner circumference of the flywheel element 2 and the radially inner region of the ring plate 20.

The ring space between the flywheel element 1 and the ring plate part 5 can house a lubricant charge 34. The escape of the latter is prevented by the ring lamellae 6 and the sealing ring 7.

Figure 3:
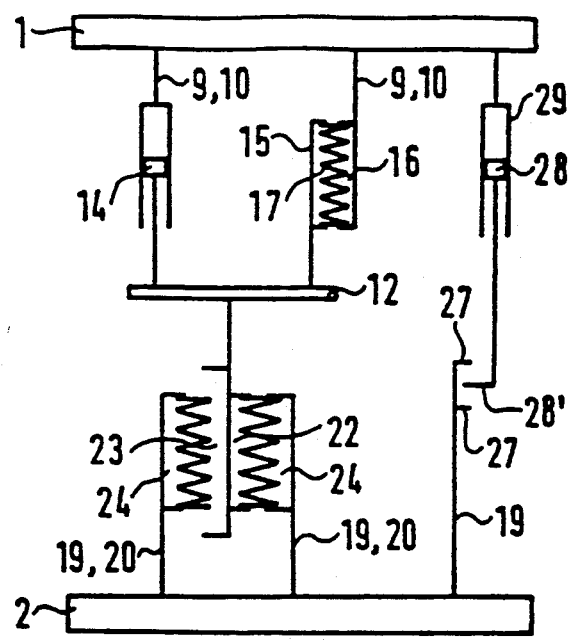
FIG. 3 shows an abstract functional diagram of the flywheel shown in FIGS. 1 and 2.

In order to permit a better explanation of the function, the divided flywheel shown in FIGS. 1 and 2 is shown again diagrammatically in FIG. 3. Each of the two flywheel elements 1 and 2 are shown as heavy bodies which can move away from or towards each other. The relative rotations between the flywheel elements 1 and 2 which occur in reality are therefore represented as pure translation movements in FIG. 3 of the drawing.

Mutually corresponding elements in FIG. 3 and in FIGS. 1 and 2 are designated by the same reference numerals.

When the ring plate 12 moves relative to the flywheel part 2, only the relatively soft springs 25 become increasingly compressed at first. As soon as the relative movement between the ring plate 12 and the flywheel element 2 is sufficiently great to use up the play available for the springs 26 within the ports 23, the springs 26, which are somewhat harder compared to the springs 25, also become increasingly compressed.

So long as no excessively high torques act between the flywheel elements 1 and 2, the ring plate 12 is retained immovably relative to the flywheel element 1 by its friction elements 14 which cooperate with the ring plates 9 and 10 on the flywheel element 1. Therefore, in the case of relative movements between the flywheel elements 1 and 2, only the springs 25 at first, and then the springs 26 also, become increasingly compressed. Then in the case of sufficiently high torques or relative movements between the flywheel elements 1 and 2, the ring plate 12 also moves relative to the flywheel element 1, namely counter to the frictional resistance of the friction elements 14 on the ring plates 9 and 10 and counter to the force of the increasingly compressed springs 17, which are dimensioned very hard compared to the springs 25 and 26.

In the case of major relative movements between the flywheel elements 1 and 2, the play of the extensions 28' of the friction ring 28 between the extensions 27 on the ring plate 19 is also used up, so that any further relative movement between the flywheel elements 1 and 2 can only occur counter to the frictional resistance between the friction ring 28 and the ring surface 29 on the flywheel element 1.

When the engine is running at very low speed, at starting speed, or no-load speed, for example, only extremely small torques can be transmitted from the engine to the transmission line. Consequently, only very weak forces act between the flywheel elements 1 and 2. These weak forces can be absorbed solely by the relatively soft springs 25. The springs 25 therefore determine the resonance frequency of the flywheel at its low speeds. This resonance frequency has very low values due to the softness of the springs 25, so that the vibrations which may occur in the transmission line or be excited by the engine have a frequency above this resonance frequency. This simultaneously ensures that the amplitudes of the vibrations which occur between the flywheel elements 1 and 2 remain relatively small; that is to say, smaller than the play available for the springs 26 in the ports 24. The frictional engagement between the friction ring 28 and the ring surface 29 is also effective for relatively small movement amplitudes of the flywheel elements 1 and 2, because the play of the extensions 28' between the extensions 27 is comparatively small. This frictional engagement remains inoperative only for very small vibration amplitudes, because the extensions 28' of the friction ring 28 are brought into a central position relative to the extensions 27 on the ring plate 19 in the course of consecutive vibrations with rotation of the friction ring 28 relative to the flywheel element 1. When the engine is running at high speed and higher torques can therefore be transmitted, the flywheel elements 1 and 2 are displaced so far by the effect of the forces acting between them, that both the springs 25 and the springs 26 become compressed. The two springs 25 and 26 therefore determine conjointly the resonance frequency of the flywheel during isolation. However, since the vibrations excited by the engine or occurring in the transmission line have a higher frequency and higher speeds, these vibrations remain in the supercritical range although the resonance frequency rises when the springs 25 and 26 are tensioned simultaneously.

The springs 17 become operative conjointly with the friction elements 14 in order to damp shocks only under extreme shock loads and/or during prolonged excitation of the resonance frequency.

Figure 4:
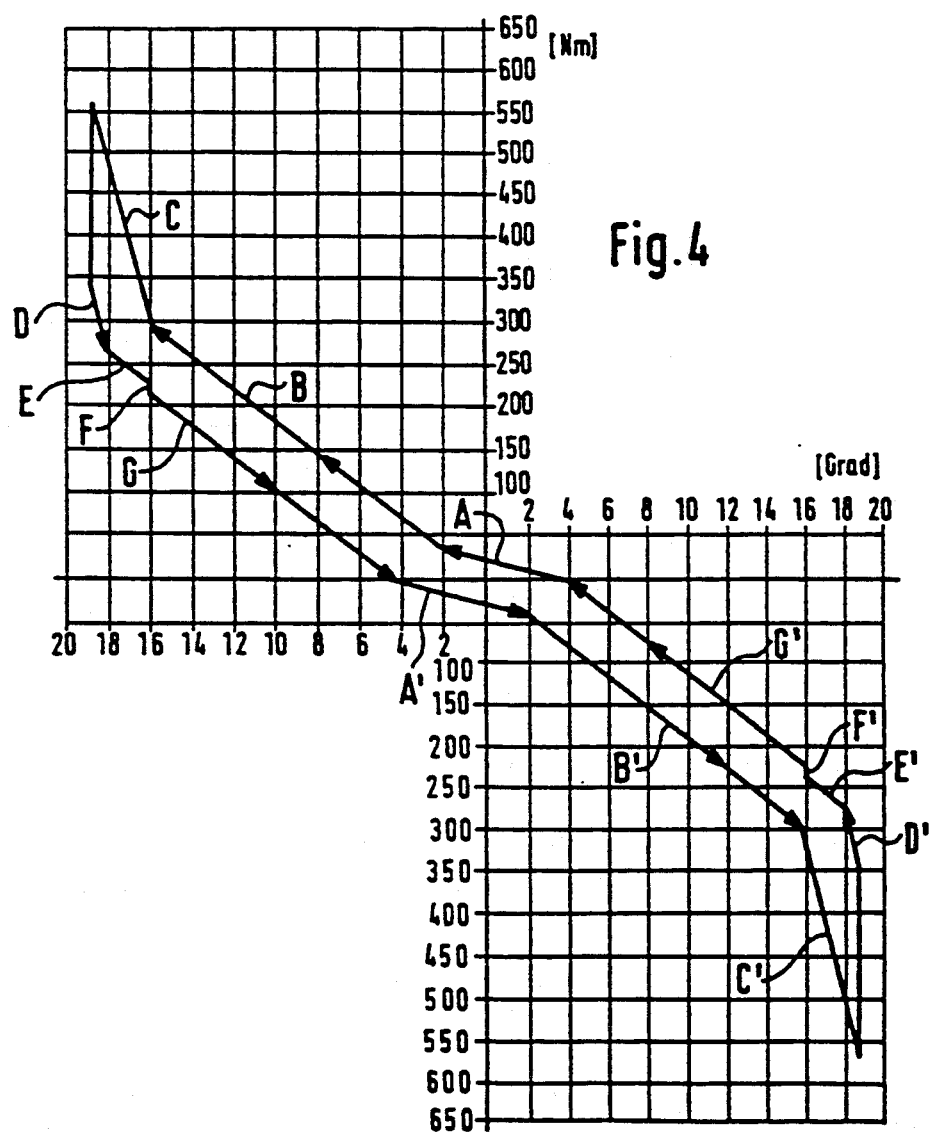
FIG. 4 shows a graph which represents the forces and resistances acting between the flywheel elements during relative rotation of the flywheel elements.

FIG. 4 shows the torsion characteristic of the divided flywheel according to the invention. The relative rotation of the flywheel elements 1 and 2 is plotted on the abscissa and the respective operative forces being plotted on the ordinate.

The flywheel elements are first of all rotated out of a relative central position and a slowly rising force has to be overcome according to the curve A, which is effected by the increasingly tensioned springs 25. The curve A does not pass through the origin of the coordinate system, because a certain basic friction between the flywheel elements 1 and 2 has be overcome. It is also assumed that the friction ring 28 extensions 28' abut the extensions 27 of the ring plate 19 in such a way that a relative rotation occurs between the friction ring 28 and the ring surface 29 of the flywheel element 1, counter to frictional resistance.

As the relative rotation between the flywheel elements increases, a force rising more steeply according to the curve B has to be overcome, because both the springs 25 and the springs 26 now become increasingly tensioned.

Finally, the steeply rising forces of the springs 17 according to the curve C also have to be overcome, the frictional forces between elements 14 being overcome to allow plates 9 and 10 to be displaced.

Upon a reversal of the movement, only a return force reduced by the frictional resistance of the friction elements 14 between the ring plates 9 and 10 according to the curve section D is operative. As soon as the springs 17 have largely relaxed, the return force is then determined only by the springs 25 and 26, according to the curve section E.

During the return movement, the frictional resistance between the friction ring 28 and the ring surface 29 is not operative at first, because after a reversal of movement, the entire play existing for the extensions 28' between the extensions 27 on the ring plate 19 is available. As soon as this play has been used up, the frictional resistance of the friction ring 28 on the ring surface 29 has to additionally be overcome and the torsion characteristic therefore has the step F.

During the further return movement, the springs 25 and 26 relax according to the curve section G, until finally the springs 26 are maximally relaxed and only the springs 25 are operative for a further relative movement between the flywheel elements 1 and 2, according to the curve section A'.

The further course of the torsion characteristic according to sections B' to G' corresponds to the course of the sections B to G apart from the change of sign.

As a variant of the embodiment illustrated, the springs 17 may optionally be omitted and the ring plate 12 coupled to the flywheel element by frictional engagement alone.

In this case, the arrangement may be made so that the ring plate 12 can rotate any distance (without rotary limitation) relative to the flywheel element 1 and counter to the resistance of the frictional engagement. In this case, the intensity of the frictional engagement is dimensioned so that the greatest torque which can be generated by the engine can still be transmitted without the ring plate 12 slipping relative to the flywheel element. A relative movement between ring plate 12 and flywheel element 1 only occurs due to intense shock, torques, or prolonged excitation of the resonance frequency of the flywheel.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A divided flywheel for an internal-combustion engine comprising
    two flywheel elements arranged coaxially with one another, between which flywheel masses are essentially distributed,
    a spring arrangement connected between the flywheel elements which has at least two groups of springs connected in parallel, one of the groups having play and the spring constants of the spring groups being sized such that the frequencies of vibrations generated at starting speed and idling speed of the engine lie above a low first critical frequency determined by another of the groups springs without play, and the frequencies of vibrations generated at operating speed lie above a higher, second critical frequency of the flywheel determined by both groups of springs conjointly, and
    a frictional coupling operative between both flywheel elements in parallel to the groups of springs and having friction elements operatively connected with at least one flywheel element to provide play less than the play of the one spring group having play and to avoid friction coupling when vibration amplitudes are small as under normal operating conditions.

2. The flywheel according to claim 1, wherein at least one of a further short-stroke and rigid group of springs is arranged in a series with the at least two group of strings.

3. The flywheel according to claim 2, wherein an abutment arrangement common to the at least two groups of springs and to the further group of springs is coupled frictionally to the one of the flywheel elements by a friction coupling parallel to the further group of springs.

4. The flywheel according to claim 1, wherein a frictional coupling is arranged, in a series with the at least two groups of springs, between an abutment arrangement common to the at least two groups of springs and the one flywheel element.

5. The flywheel according to claim 4, wherein the frictional coupling is arranged without rotational limitation.

* * * * *